United States Patent [19]

Schafers

[11] 4,112,814

[45] Sep. 12, 1978

[54] DOWELS AND PROCESS FOR ANCHORING DOWELS

[76] Inventor: Heinrich Bernhard Schäfers, Wachmannstrasse 22, Bremen, Germany, 2800

[21] Appl. No.: 780,844

[22] Filed: Mar. 24, 1977

[30] Foreign Application Priority Data

Mar. 30, 1976 [DE] Fed. Rep. of Germany ....... 2613499

[51] Int. Cl.$^2$ ............................................. F16B 13/06
[52] U.S. Cl. .......................................... 85/75; 85/87; 29/522 R
[58] Field of Search .................. 85/79, 75, 74, 76, 73, 85/77, 78, 87, 86, 84, 83, 62; 29/522

[56] References Cited

U.S. PATENT DOCUMENTS

| 1,025,275 | 5/1912 | Kennedy | 85/84 |
| 3,277,770 | 10/1966 | McCulloch | 85/79 |
| 3,332,312 | 7/1967 | Bixby | 85/83 |

FOREIGN PATENT DOCUMENTS

| 75,641 | 5/1953 | Denmark | 85/83 |
| 505,145 | 4/1920 | France | 85/75 |
| 844,097 | 7/1952 | Fed. Rep. of Germany | 85/75 |
| 1,289,682 | 2/1969 | Fed. Rep. of Germany | 85/83 |
| 2,424,494 | 12/1975 | Fed. Rep. of Germany | 85/84 |
| 103,932 | 2/1917 | United Kingdom | 85/84 |
| 1,309,391 | 3/1973 | United Kingdom | 85/75 |

*Primary Examiner*—Ramon S. Britts
*Attorney, Agent, or Firm*—Wigman & Cohen

[57] ABSTRACT

A dowel and a method of anchoring the same in a blind hole or bore of a building or construction element are disclosed. The dowel comprises a central bolt having a spreader head about which there is arranged a segmented ring of shells held together by a resilient closing ring. The blind hole has a depth less than the combined axial length of the spreader head and the ring of shells and is provided with a frustum-shaped enlargement which converges toward the opening of the blind hole. According to the anchoring method of the invention, the dowel is inserted in the blind hole until it contacts the bottom and a portion of the ring of shells protrudes therefrom. The ring of shells is then urged over the spreader head such that the shells spread outwardly into the frustum-shaped enlargement, thereby firmly anchoring the dowel against axial displacement in the bore.

11 Claims, 7 Drawing Figures

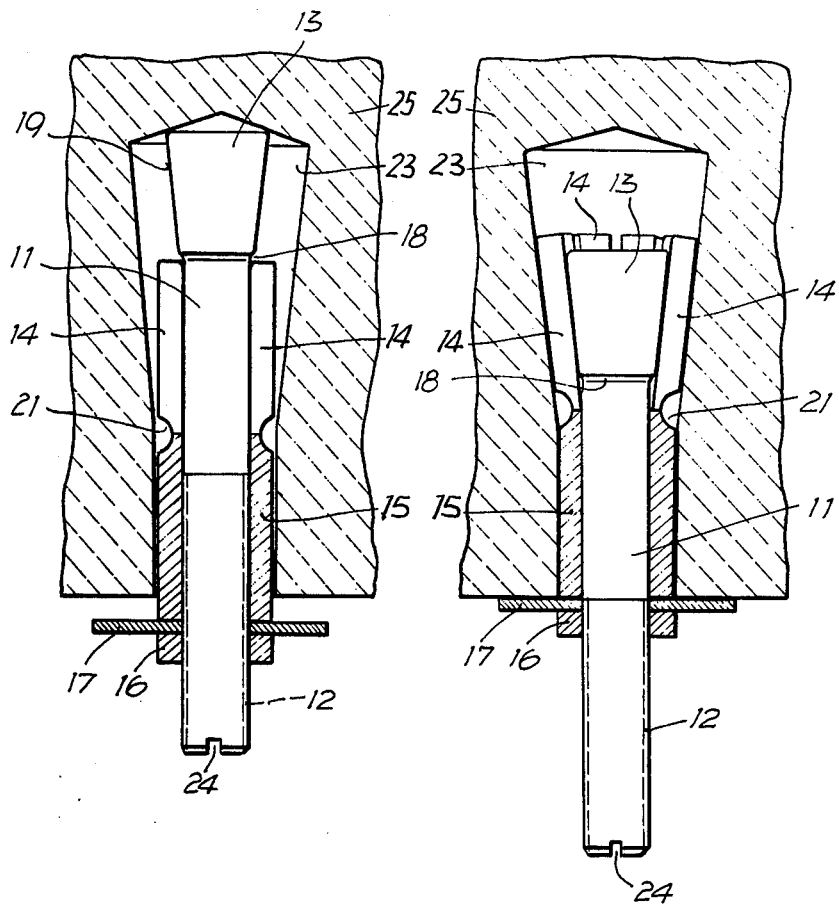
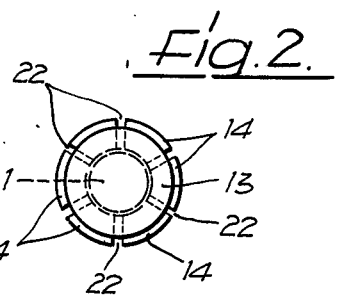

DOWELS AND PROCESS FOR ANCHORING DOWELS

The present invention relates to a process for firmly establishing a dowel in a blind hole in a part of a construction or building element, and the corresponding dowel. The dowel comprises a central bolt having an innermost tip upon which is supported a spreader head and about which a segmented ring of shells is arranged in such a way that the shells are axially adjacent the spreader head, and at the most partly overlap the spreader head. The segmented ring of shells is yieldingly held in place by a guard or closing ring.

It is a primary object of the invention to provide a process with which a dowel can be fittingly anchored, whereby, according to the process, it is always possible to confirm from exteriorly of the blind hole if the dowel is properly anchored. This object is fullfilled by the invention in that the blind hole is made to a depth such that it is less than the combined axial length of the spreader head and the segmented shells and the blind hole is further provided with a frustum-shaped enlargement tapered toward the opening of the blind borehole. The dowel can then be placed into the blind hole to the bottom thereof, whereby a part of the shells remain exposed outside the borehole. Then the segmented ring is urged over the spreader head whereby it is forced apart to fill and engage the frustum-shaped opening or enlargement of the borehole and thereby anchor the dowel tightly in the borehole, after which the ring is secured to the bolt to prevent any axial displacement.

By urging the segmented ring over the spreader head, the part of the dowel that protrudes from the building element is reduced or is drawn totally into the borehole, if it is correspondingly designed. Thus, it is always possible to visually determine whether the dowel is properly positioned or not. By means of the segmented ring of shells which are expanded into the frustum-shaped enlargement, a form-fitting connection is produced between the dowel and the building element.

The invention also relates to a dowel with a centrally located bolt which supports, on its inner tip, a spreader head about which a segmented ring of shells is arranged. The ring is axially adjacent the spreader head and, at most, partially overlaps the spreader head. The shells may be axially urged over the spreader head to produce a radial spreading of the shells which are held together by a yielding guard ring.

With the dowel of the present invention, a calculation of the safe carrying capacity of the dowel is made possible.

The objects of the invention are also fullfilled by the present dowel in that a stop is provided which restricts the relative movement of the spreader head and the shells when the shells are urged over the spreader head, so that in the expanded position, as determined by the stop, the outer surfaces of the shells form portions of a frustum surface which corresponds to the size of the frustum-shaped enlargement of the blind borehole. This results in contact of the entire outer surfaces of the shells with the inner wall of the frustum-shaped enlargement in the expanded position of the shells, so that the safe carrying capacity possible with the formlocking anchoring of the dowel can be precisely determined.

In an advantageous embodiment of the dowel, the spreader head forms gliding or sliding surfaces for the fitting of the shells, which surfaces have an inclination with respect to the longitudinal axis of the bolt and form an acute angle with such longitudinal axis. This angle opens toward the innermost tip of the spreader head and is at least one and one-half times as large as the respective angle of inclination of the frustum-shaped outer surface of the shells when they are positioned in their expanded position, as determined by the stop. The inner surfaces of the shells are shaped in such a way that they bear, in the position determined by the stop, with their entire bearing surfaces on the outer surface of the spreader head.

Because the sliding surface formed by the spreader head has an inclination which is at least one and one-half times as large as the respective inclination of the frustum-shaped outer surfaces of the shells, a relatively high resistance is produced during the movement of the spreader head into the segmented ring. Thus, the inclination can be determined in such a way that the segmented ring of shells cannot be forced over the spreader head if the borehole does not have a frustum-shaped enlargement and the shells are not, therefore, surrounded by a space into which they can move radially outwardly. If it were attempted to force the segmented ring onto the spreader head in a cylindrical borehole, even by means of a screw, then the large inclination of the sliding surface of the spreader head would have the effect that the friction of the dowel within the borehole would be lower than the friction between the shells and the spreader head, so that by turning the screw, the dowel would turn in the borehole correspondingly, thereby preventing the movement of the segmented ring over the spreader head. This is advantageous in that, if the dowel is placed into a cylindrical borehole that is not provided with a frustum-shaped enlargement, the dowel cannot be tightened and it can be determined by pulling slightly that the dowel is not properly anchored.

It has been found to be advantageous to provide an inclination of 16° for the sliding surface of the spreader head and an inclination of 9° for the frustum-shaped outer surfaces of the shell.

In the following description of exemplary embodiments, the invention is explained in detail, whereby the dowel is referred to as a building element anchor. In the drawings:

FIG. 1 is an axial section through a first embodiment of a building element anchor according to the invention, which is shown located in a blind borehole in a masonry wall, but not anchored in the wall;

FIG. 2 is an end view of the innermost tip of the building element anchor of FIG. 1;

FIG. 3 is an axial section corresponding to FIG. 1, showing the building element anchored in the masonry wall;

Figure 4:
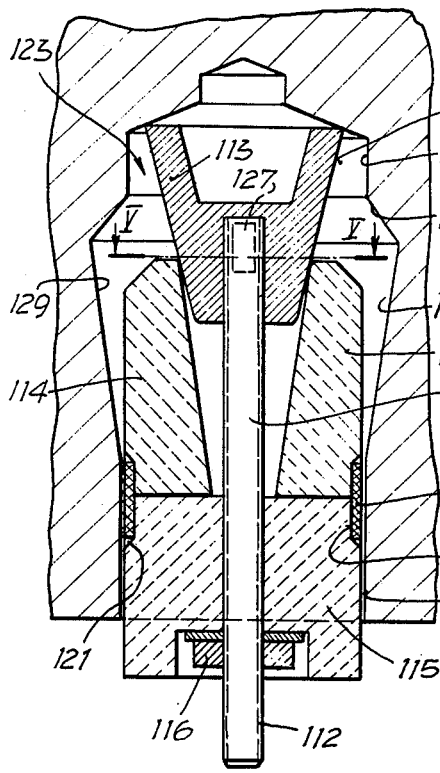
FIG. 4 is a axial section of a second embodiment according to the invention located but not anchored, in a blind borehole.

The building element anchor shown in FIGS. 1–3 comprises a metal bolt 11 having an outer thread 12, serving as means for connecting the elements to be anchored. At the innermost tip of the bolt, a spreader head 13 is formed, the outer surface 19 of which diverges towards its free end in the shape of a frustum.

About the cylindrical part of the bolt 11, a segmented ring of shells 14 is arranged, which, together with a cylindrical closing ring 15, are formed of one piece of metal, as for example, steel. Onto the thread 12 of bolt 11, a screw 16 is threaded. Between the screw 16 and the closing ring 15, a ring disc or washer 17 is positioned. The frustum-shaped circumferential outer surface 19 of the head forms, in the marginal region adjacent the shells 14, a frustum surface 18 which has a distinguishably greater inclination toward the longitudinal axis of the bolt 11 than the frustum-shaped circumferential surface 19 of the head 13, so that it forms a blocking or stop surface 18. Stop surface 18 permits overlapping of the shells 14 over the head 13 only if the shells 14 are surrounded by sufficient space. The conical angle of the stop surface 18 is about twice as large as the conical angle of the circumferential surface 19 of the head 13 and, therefore, twice as large as the inclination of the circumferential surfaces of the shells when they have been urged over the spreader head 13.

The shells 14 are formed in such a way that a cylindrical sleeve of the total length of the closing ring 15 and the shells 14 is provided at its approximate mid-point with an annular groove 21. The portion of the sleeve above the groove 21 is divided or segmented into the shells 14 by radial cuts 22. Thus, the shells 14 can be bent radially outwardly because of the construction of the groove 21, so that the shells can be forced over the frustum-shaped circumferential surface 19 of the head 13.

In order to anchor the building element anchor of FIG. 1 in a building element, as, for instance, in a wall 25, a blind hole 23 is formed in the wall 25 in a known manner and is enlarged conically adjacent its innermost end. For the production of such a hole, a tool is used with which only boreholes of the shape of borehole 23 can be made. The length and diameter of borehole 23 in the cylindrical portion thereof correspond approximately with the length and diameter of the closing ring 15 and the total length of the borehole 23 is somewhat less than the sum of the length of the head 13 and the sleeve which forms the closing ring 15 and the shells 14. The dowel shown in FIG. 1 is placed into the borehole 23 in such a way that the closing ring 15 protrudes from the borehole and a small amount of clearance remains between its outermost cylindrical surface and the cylindrical wall of the borehole. The total length of the borehole 23 and the diameter of its cylindrical portion are chosen in such a way that the closing ring 15 has only a very limited clearance in such cylindrical borehole portion. On the other hand, if the head 13 touches the bottom of the borehole 23, the shells 14 are surrounded by a sufficiently large cavity which permits the shells to be forced over the head 13 without being impeded by the walls of the borehole.

After introducing the dowel into the borehole 23, the sleeve which forms the closing ring 15 and the shells 14 is forced inwardly by means of the washer 17, so that the shells 14 are urged over the head 13. Since the shells are surrounded by a cavity, they can be urged over the stop surface 18 onto the head 13 until the washer 17 contacts the wall 25. Thereafter, the bolt 11 is drawn tightly so that the shells 14 are urged against the inner walls of the frustum-shaped enlargement of the borehole 23. This tightening can be performed by hand, however, it is also possible to use the nut 16. To prevent turning of the bolt 11 with the turning of the nut 16 a diametric slot 24 for a screwdriver is provided on the outermost end surface of the bolt 11. In this condition, the building element anchor or dowel is fittingly anchored in the wall 25 and is held securely in a tightened position by the nut 16.

On the other hand, if the dowel is placed into a borehole 23 wherein there are located pieces of rock or other foreign matter which could prevent the shells 14 from being pushed over the head 13, then the closing ring 15 extends outwardly beyond the borehole so that it can be immediately visually determined that the dowel is not properly anchored. If the building element anchor is placed in a close-fitting cylindrical borehole, the shells 14 will contact the wall of the borehole as soon as an attempt is made to urge them over the stop surface 18 and continued pushing becomes impossible. Even a forcible tightening of the dowel is impossible in this borehole, a fact that is already established by the protrusion of the closing ring 15 so that anchoring of the dowel in the wall cannot be assumed.

Figure 6:
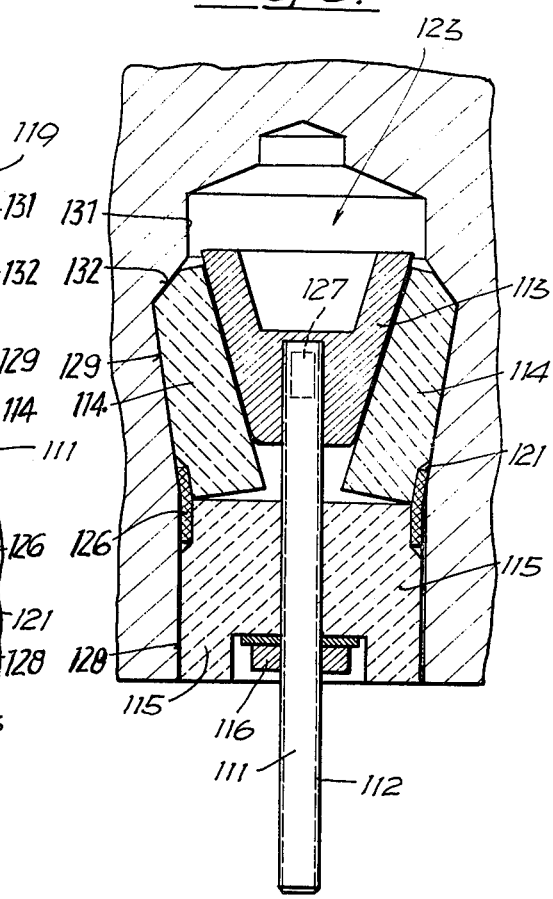
FIG. 6 is an axial section of the embodiment of FIGS. 4 and 5 shown anchored in the borehole.
Figure 5:
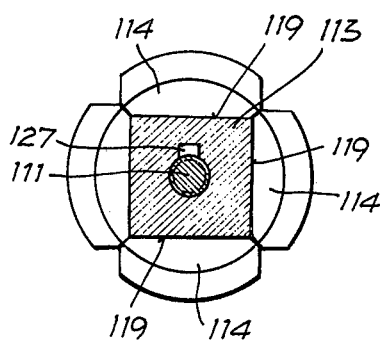
FIG. 5 is a cross-section taken along the line V—V of FIG. 4.

In the embodiment of the invention shown in FIGS. 4–6 of building element anchors or dowels, the elements of the dowel which correspond with the dowel shown in FIGS. 1–3 are designated with corresponding reference numerals enlarged by 100, so that by means of this reference the relationship with the description of the previous embodiment can be seen.

The dowel shown in FIGS. 4–6 differs from the previous embodiment by the fact that the head 113, the shells 114 and the closing ring 115 are made of an artificial rock material, for instance, concrete or ceramic, preferably, fine concrete. The individual shells 114 are, in this embodiment, connected with the closing ring 115 by a synthetic material ring 126 which is located in an annular groove 121 formed in the closing ring 115 and the shells 114. The bolt 111 has a continuous outer thread 112 and an anchoring element 127 on its innermost end. A pyramid-shaped concrete head 113 is pressed onto the bolt 111 and secured thereto by means of the anchoring element 127.

The plane outer surfaces of the pyramid-shaped head 113, which appear in a transverse section to be a rectangle, have such a large inclination relative to the longitudinal axis of the bolt 111 that they form stop surfaces in the sense described above which permit the movement of the shells 114 over the head 113 only when all the shells are surrounded by a cavity, which cavity permits the shells to be freely spread. The inner surfaces of the shells 114 confronting the bolt 111 are plane, thereby, the shell surfaces rest, during their movement over the head 113, with their forwardmost edge on the plane surfaces 119 of the head 113, so that only a line contact exists. For the embodiment shown in the drawings, it is assumed that the inclination of the frustum-shaped enlargement of the borehole 123 has a smaller conical angle than the inclination of the plane surfaces 119 of the head 113. To insure that the plane inner surfaces of the shells 114 fit tightly, when pushed over the head 113, against the outer plane surfaces 119 of the head 113 and that, at the same time, the conical circumferential surfaces of the shells 114 fit tightly against the wall of the frustum-shaped enlargement of the borehole, the shells 114 are reduced in thickness from their outer toward their innermost ends, as can be seen in FIGS. 4 and 6.

Figure 7:
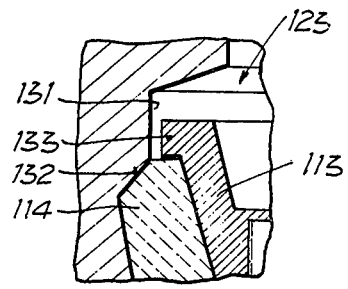
FIG. 7 is a fragmentary detail showing a modified form of the second embodiment of the invention.

To insure that the anchor cannot be pushed inwardly into the borehole in an anchored state, as would be possible with the embodiment shown in FIGS. 1–3 if the washer 17 were not provided, the borehole 123 is, in this instance, manufactured in such a way that it has an outer cylindrical portion 128, a portion 129 which enlarges toward the inner part of the borehole and, adjacent thereto, another cylindrical portion 131, the diameter of which corresponds with the diameter of cylindrical portion 128. Between the enlarged portion 129 and the inner cylindrical portion 131, there is formed a transition portion 132 which, as can be seen in FIG. 6, forms an inner stop for the shells 114 so that they are firmly held against inward and outward movement when the dowel is in its expanded position. The dowel is placed in a borehole 123 in such a way that the head 113 contacts the bottom of the borehole. The enlarged portion 129 of the borehole is thus positioned so that the shells 114 are surrounded by the cavity formed by the enlarged portion 129. It is then possible to push the shells over the head 113. During this process, the shells are expanded so that the front sections bear against the inclined walls of the borehole portion 132. Thus, the building element anchor is locked into the borehole. To tighten the dowel in this locked position, the nut 116 is turned in such a way that the bolt and, therefore, the head 113, is drawn outwardly thereby. This brings the dowel into a form-fitting tightened position against the walls of the borehole. By implementing the modified embodiment shown in FIG. 7, there can be avoided that, by excessive stress against the head 113 or by excessive tightening of the nut 116, the head 113 will be pulled so far outwardly between the shells 114 that the inner edges of the shells no longer rest against the head. If the shells are made of artificial stone, it might then be possible that, because of the radially inward pulling forces, the unsupported sections of the shells would break off. To avoid this, the modification shown in FIG. 7 has a concrete spreader head which has, on its thick innermost end, an outer rim 133 which comprises a stop for the shells 114 and thereby prevents excessive forces of the head 113 pulling between the shells 114.

It would also be possible to make the head 113, the shells 114, and/or the closing ring 115 from a synthetic material.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A dowel for anchoring in a borehole having a frustum-shaped enlargement defining a conical surface, said dowel having expanded and unexpanded positions and comprising a central bolt having an inner end and a spreader head on said inner end, a segmented ring of shells arranged about said bolt axially adjacent the spreader head in the unexpanded position of the dowel, means flexibly connected to said ring of shells for holding said ring of shells about said bolt, means for moving said ring of shells and spreader head axially relative to each other to urge the ring of shells radially outwardly toward the expanded position of the dowel, stop means for limiting the axial relative movement between the ring of shells and spreader head to determine the expanded position of the dowel, said shells having outer surfaces which define, in the expanded position of the dowel as determined by said stop means, a truncated conical surface which corresponds with the shape of said frustum-shaped enlargement, whereby substantially the entire outer surfaces of said shells engage the conical surface of said frustum-shaped enlargement.

2. A dowel according to claim 1, wherein said spreader head has outer gliding surfaces for said shells inclined with respect to the axis of the bolt, said inclined gliding surfaces forming an acute angle opening toward the inner end of the bolt, said acute angle being at least one and one-half times as large as the included angle of the truncated conical outer surface of the shells when said shells are in the expanded position of the dowel, said shells having inner surfaces which, in the expanded position of the dowel, bear with their entire surfaces against the outer gliding surfaces of the spreader head.

3. A dowel according to claim 1, including a closing ring arranged outwardly of said ring of shells and flexibly connected thereto by said flexible connecting means.

4. A dowel according to claim 1, wherein said bolt is threaded and including a nut threaded over the outer end of the bolt to secure the shells in the expanded position of the dowel.

5. A dowel according to claim 1, wherein said spreader head has outer surfaces formed as plane surfaces of a truncated pyramid, each plane outer surface of said spreader head confronting a respective shell, the inner surface of each said respective shells comprising a plane surface.

6. A dowel according to claim 5, including rim means formed about the innermost end of the spreader head for abutting the innermost ends of the shells.

7. A dowel according to claim 1, wherein at least one of said ring of shells and said spreader head are formed of artificial stone.

8. A method of firmly anchoring a dowel in a blind borehole of a construction element, said borehole having a borehole wall, a borehole opening and a borehole bottom comprising the steps of:

providing a dowel comprising a central bolt having an inner end and a spreader head on said inner end, a sleeve including a segmented ring of shells arranged about said bolt axially adjacent said spreader head, said shells each having an innermost tip and being held together by a yieldable closing ring;

forming the blind borehole of a predetermined configuration wherein the depth of said borehole is less than the combined axial length of the spreader head and the sleeve and a frustum-shaped enlargement is provided in said borehole wall converging toward the borehole opening;

inserting said dowel into the borehole until the spreader head contacts the borehole bottom and a part of the sleeve protrudes from the borehole opening a given distance defined by the difference between said combined axial length of the spreader head and sleeve and the borehole depth;

urging the ring of shells over the spreader head by relative movement between said sleeve and bolt such that said protruding sleeve part moves into said borehole a predetermined portion of said given distance; and determining whether said protruding sleeve part moves into said borehole the predetermined portion of said given distance as an indication that the ring of shells has expanded into firm contacting engagement with the frustum-shaped enlargement thereby firmly anchoring the dowel in the borehole.

9. The method according to claim 8, including the step of dimensioning the predetermined configuration of the borehole and the ring of shells such that, when the innermost tips of the shells engage the surface of the frustum-shaped enlargement of the borehole wall, the sleeve has moved into the borehole the predetermined portion of said given distance as determinable from outside said borehole.

10. The method according to claim 9, wherein the step of forming the borehole includes the step of forming said frustum-shaped enlargement at a distance from the borehole bottom such that an annular shoulder is defined at the inner end of the frustum-shaped enlargement whereby said annular shoulder serves as a stop for the innermost tips of the shells when they are urged over the spreader head.

11. The method according to claim 8, wherein the sleeve includes a cylindrical closed ring outwardly of said ring of shells and wherein said borehole forming step includes the step of forming a cylindrical portion in said borehole wall outwardly of said frustum-shaped enlargement, said cylindrical borehole wall portion receiving at least a part of the closed ring.

* * * * *